(12) United States Patent
Lee et al.

(10) Patent No.: US 9,920,249 B2
(45) Date of Patent: Mar. 20, 2018

(54) LIQUID CRYSTAL COMPOSITION

(71) Applicant: LG CHEM, LTD., Seoul (KR)

(72) Inventors: Dae Hee Lee, Daejeon (KR); Sin Young Kim, Daejeon (KR); Da Mi Lee, Daejeon (KR); Moon Soo Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 529 days.

(21) Appl. No.: 14/057,843

(22) Filed: Oct. 18, 2013

(65) Prior Publication Data

US 2014/0106089 A1   Apr. 17, 2014

Related U.S. Application Data

(63) Continuation of application No. PCT/KR2012/003123, filed on Apr. 23, 2012.

(30) Foreign Application Priority Data

Apr. 21, 2011  (KR) .................. 10-2011-0037239
Apr. 23, 2012  (KR) .................. 10-2012-0042128

(51) Int. Cl.
| | | |
|---|---|---|
| *C09K 19/56* | (2006.01) | |
| *C09K 19/38* | (2006.01) | |
| *C09K 19/20* | (2006.01) | |
| *G02F 1/13363* | (2006.01) | |
| *C09K 19/04* | (2006.01) | |

(52) U.S. Cl.
CPC ...... *C09K 19/3809* (2013.01); *C09K 19/2007* (2013.01); *C09K 19/56* (2013.01); *B32B 2457/20* (2013.01); *B32B 2457/202* (2013.01); *B32B 2457/204* (2013.01); *C09K 2019/0448* (2013.01); *C09K 2019/2035* (2013.01); *G02F 1/13363* (2013.01); *G02F 2001/133633* (2013.01); *Y10T 428/1014* (2015.01); *Y10T 428/1018* (2015.01)

(58) Field of Classification Search
CPC ............. C09K 19/3809; C09K 19/56; C09K 19/2007; C09K 2019/0448; C09K 2019/2035; B32B 2457/202; B32B 2457/20; B32B 2457/206; Y10T 428/1014; Y10T 428/1018; G02F 2001/133633; G02F 1/13363
See application file for complete search history.

(56) References Cited

U.S. PATENT DOCUMENTS 8,029,695 B2 * 10/2011 Lee .................. C09K 19/54
                                                  252/299.01
2005/0224754 A1  10/2005 Hirai et al.
(Continued)

FOREIGN PATENT DOCUMENTS

CN    101874097 A    10/2010
JP    2006251780 A   9/2006
(Continued)

*Primary Examiner* — Eli D Strah (74) *Attorney, Agent, or Firm* — Dentons US LLP (57) ABSTRACT

A liquid crystal composition, a liquid crystal film and a display device are provided. The liquid crystal composition can be uniformly aligned with no problems such as dewetting in an operation of aligning horizontally alignable liquid crystals. Also, a state of the aligned liquid crystal compound can be stably maintained.

8 Claims, 2 Drawing Sheets

(56) References Cited

U.S. PATENT DOCUMENTS

| | | | |
|---|---|---|---|
| 2006/0222784 A1* | 10/2006 | Saigusa | C09K 19/32 428/1.1 |
| 2006/0279865 A1 | 12/2006 | Ito et al. | |
| 2010/0051866 A1 | 3/2010 | Hirai et al. | |
| 2010/0143612 A1 | 6/2010 | Hirai | |
| 2010/0151154 A1 | 6/2010 | Hirai | |
| 2011/0037026 A1* | 2/2011 | Lee | C09K 19/54 252/299.63 |

FOREIGN PATENT DOCUMENTS

| | | | |
|---|---|---|---|
| JP | 2010248467 A | 11/2010 | |
| JP | 2011505445 A | 2/2011 | |
| KR | 1020070021258 A | 2/2007 | |
| KR | 1020090053711 A | 5/2009 | |
| KR | 1020100112525 A | 10/2010 | |
| TW | 200932880 A | 8/2009 | |
| WO | WO 9804651 A1 * | 2/1998 | C09K 19/38 |
| WO | 20090664947 A2 | 5/2009 | |

* cited by examiner

--PRIOR ART--

LIQUID CRYSTAL COMPOSITION

This application is a Continuation Bypass Application of International Patent Application No. PCT/KR2012/003123, filed Apr. 23, 2012, and claims the benefit of Korean Patent Application No. 10-2011-0037239 filed on Apr. 21, 2011, and Korean Patent Application No. 10-2012-0042128 filed on Apr. 23, 2012, in the Korean Intellectual Property Office, the disclosures of which are incorporated herein by reference.

BACKGROUND

1. Field of the Invention

The present application relates to a liquid crystal composition, a liquid crystal film and a display device.

2. Discussion of Related Art

There is a consistent demand to manufacture a thinner, lighter and larger-area liquid crystal display (LCD) device or plasma display panel (PDP). Also, research is being conducted to improve display uniformity, a contrast ratio and a viewing angle to realize a higher-quality image.

An optical film including a brightness enhancement film, a retardation film or a viewing angle compensation film may be used to reduce a change in color of a display device, ensure a viewing angle and improve brightness.

An elongation film prepared by elongating a polymer film to give optical anisotropy is known as such an optical film, and a method of using the optical anisotropy of a liquid crystal film manufactured by curing a polymerizable liquid crystal compound is also known in the art. Horizontally alignable liquid crystals are often used in the method of using the optical anisotropy of the liquid crystal film.

In an operation of forming a liquid crystal layer from the horizontally alignable liquid crystals, however, it is important to achieve the efficient alignment of liquid crystals and secure the alignment stability. In the case of the horizontally alignable liquid crystals, it is generally difficult to maintain uniform alignment of the liquid crystals due to weak bonding force between liquid crystals and substrate layers or liquid crystals and alignment layers, even though there is a high attraction force between liquid crystals. Also, the problems such as dewetting may be caused in part in the liquid crystal layer when the horizontally alignable liquid crystals are aligned.

When a drying time required to form a liquid crystal layer is increased, an increase in temperature is caused in an operation of forming a liquid crystal layer, or the liquid crystal layer is formed on an uneven surface, the problems regarding the alignment may be caused.

SUMMARY OF THE INVENTION

The present application is directed to providing a liquid crystal composition, a liquid crystal film and a display device.

One aspect of the present application provides a liquid crystal composition including a horizontally alignable liquid crystal compound and an amine compound. Throughout the specification, the term "horizontally alignable liquid crystal compound" may mean a liquid crystal compound in which the optical axis formed by a liquid crystal compound when a liquid crystal layer is formed may form a tilt angle of approximately 0° to approximately 25°, approximately 0° to approximately 15°, approximately 0° to approximately 10°, approximately 0° to approximately 5°, or approximately 0° with respect to a plane of the liquid crystal layer. Also, throughout the specification, the term "optical axis" may mean a slow axis or fast axis when light penetrates a corresponding region. In general, the term "optical axis" may mean the slow axis.

According to one exemplary embodiment, the liquid crystal compound may be a polymerizable liquid crystal compound. The term "polymerizable liquid crystal compound" may refer to a compound having a site capable of showing a liquid crystalline property, for example, a mesogen backbone, and also containing at least one polymerizable functional group.

According to one exemplary embodiment, the liquid crystal compound is a polymerizable liquid crystal compound that may include a multifunctional polymerizable liquid crystal compound and a monofunctional polymerizable liquid crystal compound. The term "multifunctional polymerizable liquid crystal compound" may refer to a polymerizable liquid crystal compound containing two or more polymerizable functional groups. For example, the multifunctional polymerizable liquid crystal compound may contain 2 to 10, 2 to 8, 2 to 6, 2 to 5, 2 to 4, 2 to 3, or 2 polymerizable functional groups. Also, the term "monofunctional polymerizable liquid crystal compound" may refer to a polymerizable liquid crystal compound containing one polymerizable functional group.

When the multifunctional and monofunctional polymerizable compounds are used together, phase retardation properties of the liquid crystal layer formed of the liquid crystal composition may be effectively regulated, and the obtained phase retardation properties, for example, the optical axis of the retardation layer or a phase retardation value, may also be stably maintained.

The liquid crystal composition may include the monofunctional polymerizable liquid crystal compound at a content of greater than 0 parts by weight or not more than 100 parts by weight, 1 part by weight to 90 parts by weight, 1 part by weight to 80 parts by weight, 1 part by weight to 70 parts by weight, 1 part by weight to 60 parts by weight, 1 part by weight to 50 parts by weight, 1 part by weight to 30 parts by weight, or 1 part by weight to 20 parts by weight, based on 100 parts by weight of the multifunctional polymerizable liquid crystal compound.

The mixing effect of the multifunctional and monofunctional polymerizable liquid crystal compounds may be maximized within this content range. Unless otherwise particularly defined in this specification, the unit "part(s) by weight" may mean a weight ratio.

The liquid crystal composition may satisfy the requirements of the following General Formula 1.

$$X < 8\% \qquad \text{General Formula 1}$$

In General Formula 1, X represents a percentage (%) of the absolute value of a variation in phase difference value of a liquid crystal layer formed of the liquid crystal composition after the liquid crystal layer is kept at 80° C. for 100 hours or 250 hours, based on the initial phase difference value of the liquid crystal layer.

For example, X may be calculated as follows: $100 \times (|R_0 - R_1|)/R_0$. Here, $R_0$ is an initial phase difference value of the liquid crystal layer, and $R_1$ represents a phase difference value of the liquid crystal layer after the liquid crystal layer is kept at 80° C. for 100 hours or 250 hours. For example, "X" may be 7% or less, 6% or less, or 5% or less. The variation in phase difference value may be measured using a method proposed in the following Examples.

For example, the multifunctional or monofunctional polymerizable liquid crystal compound may be a compound represented by the following Formula 1.

Formula 1

In Formula 1, A is a single bond, —COO— or —OCO—, and $R_1$ to $R_{10}$ are each independently hydrogen, a halogen, an alkyl group, an alkoxy group, an alkoxycarbonyl group, a cyano group, a nitro group, —O-Q-P or a substituent of the following Formula 2, or a pair of two adjacent substituents of $R_1$ to $R_5$ or a pair of two adjacent substituents of $R_6$ to $R_{10}$ are joined together to form a benzene ring substituted with —O-Q-P, with the proviso that at least one of the substituents $R_1$ to $R_{10}$ is —O-Q-P or a substituent of the following Formula 2, or at least one of the pair of two adjacent substituents of $R_1$ to $R_5$ and the pair of two adjacent substituents of $R_6$ to $R_{10}$ are joined together to form a benzene ring substituted with —O-Q-P, wherein Q is an alkylene group or an alkylidene group, and P is a polymerizable functional group such as an alkenyl group, an epoxy group, a cyano group, a carboxyl group, an acryloyl group, a methacryloyl group, an acryloyloxy group or a methacryloyloxy group.

Formula 2

In Formula 2, B is a single bond, —COO— or —OCO—, and $R_{11}$ to $R_{15}$ are each independently hydrogen, a halogen, an alkyl group, an alkoxy group, a cyano group, a nitro group or —O-Q-P, or a pair of two substituents of $R_{11}$ to $R_{15}$ are joined together to form a benzene ring substituted with —O-Q-P, with the proviso that at least one of the substituents $R_{11}$ to $R_{15}$ is —O-Q-P, or two adjacent substituents of $R_{11}$ to $R_{15}$ are joined together to form a benzene ring substituted with —O-Q-P, wherein Q is an alkylene group or an alkylidene group, and P is a polymerizable functional group, for example, an alkenyl group, an epoxy group, a cyano group, a carboxyl group, an acryloyl group, a methacryloyl group, an acryloyloxy group or a methacryloyloxy group.

Throughout the specification, the symbol may mean that a portion of the symbol is connected to a mother compound. For example, the symbol on the left side of B in Formula 2 may mean that B is directly connected to a benzene ring in Formula 1.

Throughout the specification, the term "single bond" may mean that no additional atoms or atom groups are present in a corresponding site. For example, the term "single bond" in Formulas 1 and 2 means that no additional atoms are present in a moiety represented by A or B. When A in Formula 1 is a single bond, for example, the benzene rings disposed on both sides of A may be directly bound to form a biphenyl structure.

In the specification, the halogen that may be used herein may include chlorine, bromine or iodine.

Unless otherwise particularly defined in the specification, the alkyl group that may be used herein may include a linear or branched alkyl group having 1 to 20 carbon atoms, 1 to 16 carbon atoms, 1 to 12 carbon atoms, 1 to 8 carbon atoms, or 1 to 4 carbon atoms, or a cycloalkyl group having 3 to 20 carbon atoms, 3 to 16 carbon atoms, 3 to 12 carbon atoms, 3 to 8 carbon atoms, or 3 to 6 carbon atoms. The alkyl group may be optionally substituted with one or more substituents.

Unless otherwise particularly defined in the specification, the alkoxy group that may be used herein may include an alkoxy group having 1 to 20 carbon atoms, 1 to 16 carbon atoms, 1 to 12 carbon atoms, 1 to 8 carbon atoms, or 1 to 4 carbon atoms. The alkoxy group may be linear, branched or cyclic. Also, the alkoxy group may be optionally substituted with one or more substituents.

Also, unless otherwise particularly defined in the specification, the alkylene or alkylidene group that may be used herein may include an alkylene or alkylidene group having 1 to 20 carbon atoms, 1 to 16 carbon atoms, 1 to 12 carbon atoms, 1 to 8 carbon atoms, 1 to 4 carbon atoms, 4 to 10 carbon atoms, or 6 to 9 carbon atoms. The alkylene or alkylidene group may be linear, branched or cyclic. The alkylene or alkylidene group may be optionally substituted with one or more substituents.

In addition, unless otherwise particularly defined in the specification, the alkenyl group that may be used herein may include an alkenyl group having 2 to 20 carbon atoms, 2 to 16 carbon atoms, 2 to 12 carbon atoms, 2 to 8 carbon atoms, or 2 to 4 carbon atoms. The alkenyl group may be linear, branched or cyclic. Also, the alkenyl group may be optionally substituted with one or more substituents.

In the specification, the substituent that may be substituted with any compounds or substituents may include, but is not limited to, an alkyl group, an alkoxy group, an alkenyl group, an epoxy group, a cyano group, a carboxyl group, an acryloyl group, a methacryloyl group, an acryloyloxy group, a methacryloyloxy group or an aryl group.

In Formulas 1 and 2, P may be an acryloyl group, a methacryloyl group, an acryloyloxy group or a methacryloyloxy group, may be an acryloyloxy group or a methacryloyloxy group, or may be an acryloyloxy group.

The —O-Q-P which may be present at least one in Formulas 1 and 2 or the residue of Formula 2 may be, for example, present in a position of $R_3$, $R_8$ or $R_{13}$. For example, the number of the —O-Q-P may be one or two. Also, in the compound of Formula 1 or the residue of Formula 2, the substituent other than the —O-Q-P or the residue of Formula 2 may be, for example, hydrogen, a halogen, a linear or branched alkyl group having 1 to 4 carbon atoms, a cycloalkyl group having 4 to 12 carbon atoms, an alkoxy group having 1 to 4 carbon atoms, a cyano group or a nitro group. According to another exemplary embodiment, the substituent other than the —O-Q-P or the residue of Formula 2 may be chlorine, a linear or branched alkyl group having 1 to 4 carbon atoms, a cycloalkyl group having 4 to 12 carbon atoms, an alkoxy group having 1 to 4 carbon atoms, or a cyano group.

The liquid crystal composition includes an amine compound. The amine compound may react with a polymerizable functional group of the liquid crystal compound, for example, in an operation of aligning the liquid crystal compound so that the amine compound can function to uniformly align the liquid crystal compound with no problems such as dewetting and also to secure the alignment stability after the alignment.

As the amine compound, a compound that can function as described above may be used without particular limitation. According to one exemplary embodiment, a compound represented by the following Formula 3 may be used as the compound.

Formula 3

In Formula 3, $R_{16}$ and $R_{17}$ are each independently a monovalent hydrocarbon group, -$L_3$-N($R_{18}$)($R_{19}$), -$L_3$-Si($R_{18}$)$_n$(O$R_{19}$)$_{3-n}$ or -$L_3$-N($R_{18}$)-$L_3$-Si($R_{18}$)$_n$(O$R_{19}$)$_{3-n}$, or may be joined together to form a single bond or a linker represented by the following Formula 4, wherein $R_{18}$ and $R_{19}$ are each independently hydrogen or a monovalent hydrocarbon group, n is an integer ranging from 0 to 2, and $L_1$ to $L_3$ are each independently a single bond or a linker of Formula 4.

In Formula 3, however, when both of $L_1$ and $L_2$ are a single bond, $R_{16}$ and $R_{17}$ may not be hydrogen at the same time.

Formula 4

In Formula 4, $L_a$ and $L_e$ are each independently a single bond, an alkylene group or an alkylidene group, $L_c$ is an alkylene group or an alkylidene group, and $L_b$ and $L_d$ are each independently a single bond, —O—, —C(═O)—, —NH—, —CH═CH—, CONH—, a cycloalkylene group or an arylene group.

Throughout the specification, the term "monovalent hydrocarbon group" may mean a monovalent residue derived from an organic compound composed of carbon and hydrogen, or a derivative thereof. According to one exemplary embodiment, the monovalent hydrocarbon group that may be used herein may include a monovalent hydrocarbon group having 1 to 20 carbon atoms, 1 to 16 carbon atoms, 1 to 12 carbon atoms, 1 to 8 carbon atoms, or 1 to 4 carbon atoms. More particularly, the monovalent hydrocarbon group that may be used herein may include, but is not limited to, an alkyl group, an alkenyl group or an aryl group.

Also, unless otherwise particularly defined in the specification, the term "aryl group or arylene group" may mean a monovalent or divalent residue derived from a compound having a benzene ring or including a structure in which two or more benzene rings are connected or condensed, or a derivative thereof. That is, in addition to the aryl group generally referred to as the aryl group, an aralkyl group or an arylalkyl group may be, for example, included in the above-described scope of the term "aryl group." For example, such an aryl or arylene group may be an aryl or arylene group having 6 to 25 carbon atoms, 6 to 21 carbon atoms, 6 to 18 carbon atoms, or 6 to 13 carbon atoms.

In addition, in Formulas 3 and 4, the cycloalkylene group that may be used herein may include a cycloalkylene group having 3 to 20 carbon atoms, 3 to 16 carbon atoms, 3 to 12 carbon atoms, or 3 to 8 carbon atoms. Such a cycloalkylene group may be optionally substituted with one or more substituents.

According to one exemplary embodiment, the amine compound that may be used herein may be a compound in which, in Formula 3, each of $L_1$ and $L_2$ is a single bond, $R_{16}$ is hydrogen, $R_{17}$ is a monovalent hydrocarbon group or -$L_3$-N($R_{18}$)($R_{19}$), $L_3$ is an alkylene or alkylidene group having 1 to 12 carbon atoms, 1 to 8 carbon atoms, or 1 to 4 carbon atoms, and $R_{18}$ and $R_{19}$ are each independently hydrogen or a monovalent hydrocarbon group. For example, the monovalent hydrocarbon group in the compound may be a linear or branched alkyl group having 1 to 12 carbon atoms, 1 to 8 carbon atoms or 1 to 4 carbon atoms, or a cycloalkyl group having 3 to 16 carbon atoms, 3 to 12 carbon atoms, 3 to 8 carbon atoms, or 3 to 6 carbon atoms. For example, such a compound that may be used herein may include, but is not limited to, methyl amine, ethyl amine, 1-propyl amine, 2-propyl amine, 1-butyl amine, 2-butyl amine, 3-dimethylaminopropyl amine, cyclopropyl amine, cyclobutyl amine or cyclohexyl amine.

According to one exemplary embodiment, the amine compound that may be used herein may be a compound in which, in Formula 3, each of $L_1$ and $L_2$ is a single bond, $R_{16}$ and $R_{17}$ are each independently a monovalent hydrocarbon group or -$L_3$-N($R_{18}$)($R_{19}$), $L_3$ is an alkylene or alkylidene group having 1 to 12 carbon atoms, 1 to 8 carbon atoms, or 1 to 4 carbon atoms, and $R_{18}$ and $R_{19}$ are each independently hydrogen or a monovalent hydrocarbon group. For example, the monovalent hydrocarbon group in the compound may be a linear or branched alkyl group having 1 to 12 carbon atoms, 1 to 8 carbon atoms or 1 to 4 carbon atoms, or a cycloalkyl group having 3 to 16 carbon atoms, 3 to 12 carbon atoms, 3 to 8 carbon atoms or 3 to 6 carbon atoms. For example, such a compound that may be used herein may include, but is not limited to, dimethyl amine, diethyl amine, dipropyl amine or dibutyl amine.

According to another exemplary embodiment, the amine compound that may be used herein may be a compound in which, in Formula 3, each of $L_1$ and $L_2$ is a single bond, and $R_{16}$ and $R_{17}$ may be joined together to form a linker of Formula 4. In the linker of Formula 4 present in such a compound, for example, each of $L_a$, $L_d$ and $L_e$ may be a single bond, $L_b$ may be a single bond, —O—, —C(═O)—, —NH— or —CONH—, and $L_c$ may be an alkylene group having 1 to 12 carbon atoms or 1 to 8 carbon atoms. As such, according to another exemplary embodiment, $L_b$ maybe a single bond, —O— or —C(═O)—, or may be a single bond or —C(═O)—. Such a compound that may be used herein may include azetidine, pyrrolidine, piperidine, 2-azetidinone, 2-pyrrolidinone or 2-piperidinone.

According to still another exemplary embodiment, the amine compound that may be used herein may be a compound in which, in Formula 3, $R_{16}$ and $R_{17}$ are each independently a monovalent hydrocarbon group, $-L_3-Si(R_{18})_n(OR_{19})_{3-n}$ or $-L_3-N(R_{18})-L_3-Si(R_{18})_n(OR_{19})_{3-n}$. For example, the compound may be a compound in which, in Formula 3, each of $R_{16}$ and $R_{17}$ is $-L_3-Si(R_{18})_n(OR_{19})_{3-n}$ or $-L_3-N(R_{18})-L_3-Si(R_{18})_n(OR_{19})_{3-n}$, $L_1$ and $L_2$ are each independently a single bond or a linker of Formula 4, with the proviso that, in Formula 4, each of $L_a$, $L_b$, $L_d$ and $L_e$ is a single bond, $L_c$ is an alkylene group having 1 to 12 carbon atoms, 1 to 8 carbon atoms, or 1 to 4 carbon atoms, $L_3$ is an alkylene group having 1 to 12 carbon atoms, 1 to 8 carbon atoms, or 1 to 4 carbon atoms, and $R_{18}$ and $R_{19}$ are each independently an alkyl group having 1 to 12 carbon atoms, 1 to 8 carbon atoms, or 1 to 4 carbon atoms. Such a compound that may be used herein may include bis(3-trimethoxy silylpropyl) amine, bis(3-triethoxy silylpropyl) amine, bis(3-trimethoxy silylpropyl)ethylene diamine or bis(3-triethoxy silylpropyl)ethylene diamine.

According to yet another exemplary embodiment, the compound may be a compound in which, in Formula 3, $R_{16}$ is a monovalent hydrocarbon group having 1 to 12 carbon atoms, 1 to 8 carbon atoms or 1 to 4 carbon atoms, for example, an alkyl group, each of $L_1$ and $L_2$ is a single bond, and $R_{17}$ is $-L_3-Si(R_{18})_n(OR_{19})_{3-n}$ or $-L_3-N(R_{18})-L_3-Si(R_{18})_n(OR_{19})_{3-n}$, wherein $L_3$ is an alkylene group having 1 to 12 carbon atoms, 1 to 8 carbon atoms or 1 to 4 carbon atoms, and $R_{18}$ and $R_{19}$ are each independently an alkyl group having 1 to 12 carbon atoms, 1 to 8 carbon atoms or 1 to 4 carbon atoms. Such a compound that may be used herein may include, but is not limited to, N-(n-butyl)-3-aminopropyltrimethoxysilane, N-(n-butyl)-3-aminopropyltriethoxysilane, N-methyl aminopropyltrimethoxysilane or N-methyl aminopropyltriethoxysilane.

In the liquid crystal composition, a content of the amine compound is not particularly limited, but may be selected in consideration of desired effects. According to one exemplary embodiment, the amine compound may be included at a content of 0.01 parts by weight to 10 parts by weight, based on 100 parts by weight of the horizontally alignable liquid crystal compound. The effective and uniform alignment and the alignment stability of the horizontally aligned liquid crystal compound may be secured within this content range.

When the liquid crystal compound is a polymerizable liquid crystal compound, the liquid crystal composition may further include a polymerization initiator, for example, a photopolymerization initiator. For example, the photopolymerization initiator may initiate polymerization of the polymerizable liquid crystal compound by irradiation with light. In the specification, the irradiation with light may, for example, mean irradiation with electromagnetic waves such as microwaves, infrared rays (IR), ultraviolet rays (UV), X-rays or gamma rays, or particle beams such as alpha-particle beams, proton beams, neutron beams or electron beams.

Kinds of the photopolymerization initiator are not particularly limited, and may be properly selected and used according to purpose. The photopolymerization initiator that may be used herein may include benzyl (also referred to as "bibenzoyl"), benzoin isobutyl ether, benzoin isopropyl ether, benzophenone, benzoylbenzoic acid, methyl benzoylbenzoate, 4-benzoyl-4'-methyldiphenyl sulfide, benzylmethylketal, dimethylamino methyl benzoate, 2-n-butoxyethyl-4-dimethylaminobenzoate, isoamyl p-dimethylamino benzoate, 3-3'-dimethyl-4-methoxybenzophenone, methylbenzoylformate, 2-methyl-1-(4-(methylthio)phenyl)-2-morpholinopropan-1-one, 2-benzyl-2-dimethyl amino-1-(4-morpholinophenyl)-butan-1-one, 1-(4-dodecylphenyl)-2-hydroxy-2-methylpropan-1-one, 1-hydroxycyclohexylphenylketone, 2-hydroxy-2-methyl-1-phenylpropan-2-one, 1-(4-isopropylphenyl)-2-hydroxy-2-methylpropan-1-one, 2-chlorothioxanthone, 2,4-diethylthioxanthone, 2,4-diisopropylthioxanthone, 2,4-dimethylthioxanthone, isopropylthioxanthone or 1-chloro-4-propoxythioxanthone. As necessary, the photopolymerization initiator may be used together with a proper sensitizer.

A specific content of the photopolymerization initiator is not particularly limited, and may be properly selected according to purpose. For example, the photopolymerization initiator may be included at a content of 1 part by weight to 10 parts by weight, based on 100 parts by weight of the horizontally alignable liquid crystal compound, but the present application is not limited thereto. When the content of the photopolymerization initiator is excessively low, proper polymerization may not be induced, whereas, when the content of the optical polymerization initiator is excessively high, physical properties of the liquid crystal layer may be degraded due to the presence of the initiator remaining after formation of the liquid crystal layer. Therefore, the content of the photopolymerization initiator may be properly selected in consideration of these facts.

The liquid crystal composition may further include a surfactant. As such, the surfactant that may be used herein may include, for example, a fluorocarbon-based or silicon-based surfactant. Here, Fluorad FC4430, Fluorad FC4432, Fluorad FC4434 (3M, US) or Zonyl (Dupont, US) may be used as the fluorocarbon-based surfactant, and BYK (BYK-Chemie) may be used as the silicon-based surfactant, but the present application is not limited thereto.

A content of the surfactant is not particularly limited. For example, the surfactant may be included at a content of 0.05 to 5 parts by weight, based on 100 parts by weight of the horizontally alignable liquid crystal compound. When the content of the surfactant is excessively low, a surface state of the liquid crystal layer is poor, whereas, when the content of the surfactant is excessively high, stains may be generated due to the presence of the surfactant. Therefore, the content of the surfactant may be properly selected in consideration of these facts.

Also, the liquid crystal composition may further include a solvent. For example, the solvent that may be used herein may include a halogenated hydrocarbon such as chloroform, dichloromethane, tetrachloroethane, trichloroethylene, tetrachloroethylene or chlorobenzene; an aromatic hydrocarbon such as benzene, toluene, xylene, methoxy benzene or 1,2-dimethoxybenzene; an alcohol such as acetone, methylethylketone, cyclohexanone or cyclopentanone; a cellosolve such as methyl cellosolve, ethyl cellosolve or butyl cellosolve; or an ether such as diethylene glycol dimethylether (DEGDME), dipropylene glycol dimethylether (DPGDME), etc., but the present application is not limited thereto. The solvent may be included in the form of a single solvent or mixed solvent. A content of the solvent in the liquid crystal composition is not particularly limited, and may be properly included in consideration of desired effects, for example, a coating property, etc.

In addition to the above-described compounds, the liquid crystal composition may further include a known additive, for example, a polymerizable non-liquid crystal compound, a stabilizing agent or a non-polymerizable non-liquid crystal compound, as necessary.

Also, the present application is directed to providing a liquid crystal film (LCF). The LCF according to one exemplary embodiment may include a liquid crystal layer including the above-described liquid crystal composition.

The liquid crystal layer may include a horizontally alignable liquid crystal compound in a horizontally aligned state. According to one exemplary embodiment, the compound may be polymerized in a horizontally aligned state so that the compound can be included in the liquid crystal layer. Throughout the specification, the term "horizontal alignment" may mean that the optical axis of a liquid crystal layer including a liquid crystal compound has an inclination angle of approximately 0° to approximately 25°, approximately 0° to approximately 15°, approximately 0° to approximately 10°, approximately 0° to approximately 5°, or approximately 0° with respect to a plane of the liquid crystal layer.

For example, the liquid crystal layer may include a horizontally alignable liquid crystal compound, and the liquid crystal compound may be included in a polymerized form. Also, in this specification, the expression "polymerizable liquid crystal compound being included in a polymerized form" may refer to a state in which the liquid crystal compound is polymerized to form the backbone (that is, a main chain or a side chain) of a liquid crystal polymer in the liquid crystal layer.

In addition, the liquid crystal layer may include a polymerizable liquid crystal compound in a non-polymerized state, or may further include a known additive such as a polymerizable non-liquid crystal compound, a stabilizing agent, a non-polymerizable non-liquid crystal compound or an initiator.

The liquid crystal film may be applied to various applications. According to one exemplary embodiment, the liquid crystal layer shows a phase retardation property. Thus, the liquid crystal film may be used for a retardation film, a viewing angle compensation film and a reflective polarizing plate, which are applied to display devices such as LCDs. According to one exemplary embodiment, the liquid crystal layer may be a retardation layer showing ¼, ½ or ¾ wavelength layer characteristics. Throughout the specification, the term "n wavelength layer" may refer to a retardation element that can retard light incident on the wavelength layer by n times a wavelength range of the light.

According to one exemplary embodiment, the liquid crystal layer has a difference in in-plane refractive indexes in a slow axis direction and a fast axis direction of 0.05 to 0.2, 0.07 to 0.2, 0.09 to 0.2 or 0.1 to 0.2. As such, the in-plane refractive index in the slow axis direction may refer to a refractive index in a direction in which the maximum value of the refractive index is defined with respect to the plane of the liquid crystal layer, and the in-plane refractive index in the fast axis direction may refer to a refractive index in a direction in which the minimum value of the refractive index is defined with respect to the plane of the liquid crystal layer. In general, the fast axis and slow axis in an optically anisotropic liquid crystal layer are formed perpendicularly to each other. Each of the refractive indexes may be measured with respect to light at a wavelength of 550 nm or 589 nm. For example, the difference in refractive index was measured according to the manufacturer's manual using Axoscan (commercially available from Axomatrix). Also, the liquid crystal layer may have a thickness of approximately 0.5 μm to 2.0 μm or approximately 0.5 μm to 1.5 μm. The liquid crystal layer satisfying the relationship of the refractive indexes and having the thickness may express a phase retardation property suitable for use in applications.

Figure 1:
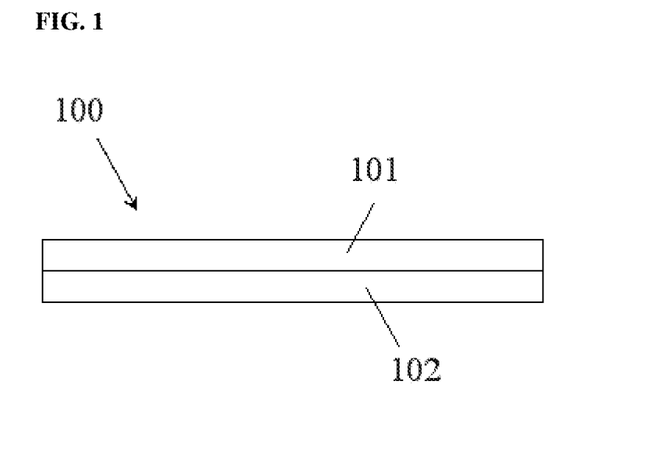
FIG. 1 is a diagram showing a liquid crystal film according to one exemplary embodiment.

The liquid crystal film according to one exemplary embodiment may further include a substrate layer. When the liquid crystal film includes a substrate layer, the liquid crystal layer may be formed on at least one surface of the substrate layer. FIG. 1 is a cross-sectional view of a liquid crystal film 100 according to one exemplary embodiment, showing that a liquid crystal layer 101 is formed on one surface of a substrate layer 102.

Various kinds of the substrate layer may be used herein. According to one exemplary embodiment, an optically isotropic substrate layer, an optically anisotropic substrate layer such as a retardation layer showing a phase retardation property, or a polarizing element may be used as the substrate layer.

A transparent substrate layer such as a glass or transparent plastic substrate layer may be used as the optically isotropic substrate layer. Examples of the plastic substrate layer that may be used herein may include a cellulose substrate layer such as a diacetyl cellulose (DAC) or triacetyl cellulose (TAC) substrate layer; a cyclo-olefin copolymer (COP) substrate layer such as a norbornene derivative resin substrate layer; an acrylic substrate layer such as a poly(methyl methacrylate) (PMMA) substrate layer; a polycarbonate (PC) substrate layer; an olefinic substrate layer such as a polyethylene (PE) or polypropylene (PP) substrate layer; a polyvinyl alcohol (PVA) substrate layer; a polyethersulfone (PES) substrate layer; a polyetheretherketone (PEEK) substrate layer; a polyetherimide (PEI) substrate layer; a polyethylenenaphthalate (PEN) substrate layer; a polyester substrate layer such as a polyethyleneterephthalate (PET) substrate layer; a polyimide (PI) substrate layer; a polysulfone (PSF) substrate layer; a polyarylate (PAR) substrate layer or a fluororesin substrate layer. For example, the substrate layer may be in the form of a sheet or film.

For example, a ¼ wavelength layer or a ½ wavelength layer may be used as the optically anisotropic substrate layer, for example, the retardation layer. Such a retardation layer may be a liquid crystal polymer layer formed by aligning and polymerizing a polymerizable liquid crystal compound, or a plastic film or sheet which gives birefringence through an elongation or shrinkage process.

A typical element known in the art may be used as the polarizing element. For example, an element manufactured by adsorbing a dichroic dye onto a polyvinyl alcohol resin and aligning the polyvinyl alcohol resin may be used as the polarizing element.

As necessary, the substrate layer may be subjected to various surface treatments such as low reflection treatment, anti-reflection treatment, anti-glare treatment and/or high-resolution anti-glare treatment.

The liquid crystal film according to one exemplary embodiment may further include an alignment layer formed between the substrate layer and the liquid crystal layer. Referring to FIG. 1, for example, the liquid crystal film 100 may include an alignment layer as an additional layer formed between the substrate layer 102 and the liquid crystal layer 101. The alignment layer may serve to align a liquid crystal compound during formation of the liquid crystal film. As the alignment layer, a typical alignment layer known in the art, for example, an alignment layer formed using an imprinting method, a photoalignment layer, or a rubbing alignment layer may be used. The alignment layer is optional component, and the substrate layer may be given an alignment property without use of an alignment layer by directly rubbing or elongating the substrate layer.

In addition, the present application is directed to providing a method of manufacturing a liquid crystal film. The method of manufacturing a liquid crystal film according to one exemplary embodiment may include forming a liquid crystal layer using the liquid crystal composition.

As such, the liquid crystal layer may, for example, be prepared by forming an alignment layer, forming a coating layer of the liquid crystal composition on the alignment layer and polymerizing the liquid crystal composition in an aligned state to form a liquid crystal layer. In this case, the alignment layer may be, for example, formed on the above-described substrate layer.

The alignment layer may be, for example, formed using a method of rubbing a polymer film such as polyimide; a method of coating a photoalignment compound and aligning the photoalignment compound by irradiation with linearly polarized light; or an imprinting method such as nanoimprinting. Various methods of forming an alignment layer that can align the horizontally alignable liquid crystal compound are known in the art.

The coating layer of the liquid crystal composition may be formed by coating a composition on an alignment layer using a method known in the art. For example, a liquid crystal layer may be formed by aligning a liquid crystal composition according to an alignment pattern of the alignment layer disposed under the coating layer and polymerizing the liquid crystal composition.

Furthermore, the present application is directed to providing a display device. The display device according to one exemplary embodiment may include the liquid crystal film. For example, the display device may be a liquid crystal display device (LCD).

The liquid crystal film may be widely used in the display device, etc. For example, the liquid crystal film may be effectively used as an optical compensation substrate for LCDs. Therefore, the liquid crystal film may be included as the optical compensation substrate in the LCD. For example, the liquid crystal film may also be used as a retardation film such as in a super twisted nematic (STN) LCD, a thin film transistor-twisted nematic (TFT-TN) LCD, a vertical alignment (VA) LCD or an in-plane switching (IPS) LCD; a ½ wavelength plate; a ¼ wavelength plate; a film having reverse wavelength dispersion characteristics; an optical compensation film; a color tilter; a stacked film including polarizing plate or a polarizer; a polarizing plate compensation film, etc.

Depending on the applications of the liquid crystal film, there is no particular limitation on a method of configuring a display device using the liquid crystal film. The number of films to be installed in the LCD and the method of configuring the LCD according to the applications of the liquid crystal film are widely known in the art. In this case, all the methods are applicable in the present application.

EFFECT

The liquid crystal composition according to the exemplary embodiments of the present application can be uniformly aligned with no problems such as dewetting in an operation of aligning horizontally alignable liquid crystals. Also, a state of the aligned liquid crystal compound can be stably maintained.

DETAILED DESCRIPTION OF EXEMPLARY EMBODIMENTS

Hereinafter, exemplary embodiments of the liquid crystal composition will be described in detail. However, the liquid crystal composition is not limited to the embodiments disclosed below.

Example 1

A surface of a TAC substrate layer (refractive index: 1.49, thickness: 80,000 nm) was coated with a composition for forming a photoalignment layer so that a thickness of a coating layer after drying could amount to approximately 1,000 Å, and dried at 80° C. for 2 minutes in an oven. A composition (polynorbornene:acrylic monomer:photoinitiator=2:1:0.25 (based on the weight ratio)), which was prepared by mixing a photoinitiator (Irgacure 907) with a mixture of an acrylic monomer and polynorbornene (molecular weight ($M_w$)=150,000) having a cinnamate group of the following Formula A and dissolving the resulting mixture in a toluene solvent so that a solid concentration of the polynorbornene could amount to 2% by weight, was used as the composition for forming a photoalignment layer.

Formula A

Figure 2:
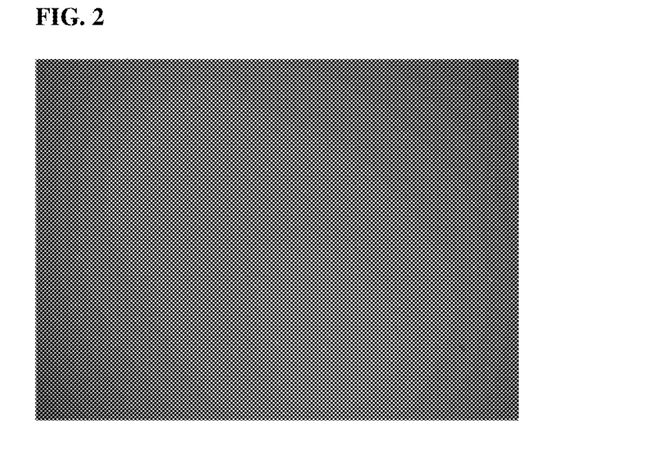
FIG. 2 is a photograph showing a liquid crystal layer prepared in Example 1.
Figure 3:
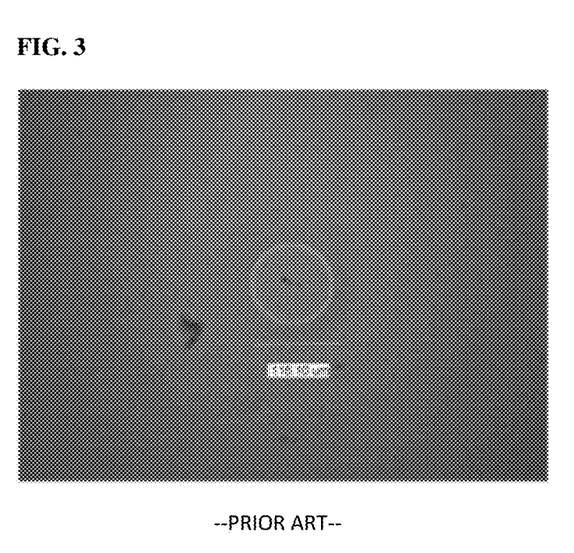
FIG. 3 is a photograph showing a liquid crystal layer prepared in Comparative Example 1.

The dried composition for forming a photoalignment layer was subjected to alignment treatment to form a photoalignment layer. A wire grid polarizing plate that can generate linearly polarized light in a predetermined direction was disposed on the dried composition. Thereafter, the dried composition was aligned by irradiating the composition with UV rays (300 mW/cm$^2$) for approximately 30 seconds while transferring the TAC substrate layer at a rate of approximately 3 m/min. Then, a liquid crystal layer was formed on the alignment layer undergoing the alignment treatment. As the liquid crystal composition, a liquid crystal composition including 70 parts by weight of a multifunctional polymerizable liquid crystal compound represented by the following Formula B, 30 parts by weight of a monofunctional polymerizable liquid crystal compound represented by the following Formula C, 3-propyl amine as an amine compound, which was present at a content of 0.5 parts by weight based on 100 parts by weight of the multifunctional and monofunctional polymerizable liquid crystal compounds, and a suitable amount of a photoinitiator was coated to a drying thickness of approximately 1 μm, and the liquid crystal composition was aligned according to alignment of the alignment layer disposed under the liquid crystal layer. Then, a liquid crystal layer, which included a horizontally aligned liquid crystal compound aligned according to the alignment of the photoalignment film disposed under the liquid crystal layer, was formed by irradiating the liquid crystals with UV rays (300 mW/cm²) for approximately 10 seconds. A photograph taken of the liquid crystal layer formed as described above is shown in FIG. 2.

was not used during preparation of the liquid crystal composition. A photograph taken of the prepared liquid crystal layer is shown in FIG. 3.

Example 2

A liquid crystal film was manufactured in the same manner as in Example 1, except that 55 parts by weight of the multifunctional polymerizable liquid crystal compound represented by Formula B and 45 parts by weight of the monofunctional polymerizable liquid crystal compound represented by Formula C were mixed during preparation of the liquid crystal composition.

Example 3

A liquid crystal film was manufactured in the same manner as in Example 1, except that 3-dimethylaminopropyl amine was used as the amine compound at a content of 0.7 parts by weight, based on 100 parts by weight of the multifunctional and monofunctional polymerizable liquid crystal compounds.

Example 4

A liquid crystal film was manufactured in the same manner as in Example 1, except that diethyl amine was used as the amine compound at a content of 1 part by weight, based on 100 parts by weight of the multifunctional and monofunctional polymerizable liquid crystal compounds.

Example 5

A liquid crystal film was manufactured in the same manner as in Example 1, except that 3-(N-propylamino) propyl trimethoxy silane was used as the amine compound at a content of 0.5 parts by weight, based on 100 parts by weight of the multifunctional and monofunctional polymerizable liquid crystal compounds.

Comparative Example 1

A liquid crystal film was manufactured in the same manner as in Example 1, except that the amine compound

Experimental Example 1: Evaluation of Durability of Liquid Crystal Layer

The durability of a liquid crystal layer was evaluated by measuring a variation of a phase difference value caused after a durability test of the liquid crystal layers prepared in Examples and Comparative Examples. More particularly, a liquid crystal film was cut into pieces having a size of 10 cm×10 cm (width×length), thereby preparing a test sample. The test sample was then kept under a heat-resistant condition of 80° C. for 100 hours or 250 hours. Then, a decrease in phase difference values of the liquid crystal layer before and after being kept under the heat-resistant condition was calculated as the percentage (%), and evaluated according to the following evaluation criteria. As such, the phase difference value was measured at a wavelength of 550 nm according to the manufacturer's manual using Axoscan (commercially available from Axomatrix). The durability evaluation results are as follows: it is marked by "O" when variations in phase difference values of the liquid crystal layers after being kept under a heat-resistant condition for 100 hours and 250 hours were less than 8%, and "X" when a variation in phase difference value of any one of the liquid crystal layers after being kept under a heat-resistant condition for 100 hours and 250 hours was 8% or more. The evaluation results are summarized in the following Table 1.

TABLE 1

|  | Durability of liquid crystal layer |
| --- | --- |
| Example 1 | O |
| Example 2 | O |
| Example 3 | O |
| Example 4 | O |
| Example 5 | O |
| Comparative Example 1 | X |

What is claimed is:

1. A liquid crystal film comprising a liquid crystal layer including a liquid crystal composition, the liquid crystal composition comprising:

a horizontally alignable liquid crystal compound; and
an amine compound represented by Formula 3:

[Formula 3]

wherein the amine compound is a compound in which, in Formula 3, each of L1 and L2 is a single bond, R16 and R17 are each independently an alkyl group having 1 to 12 carbon atoms, or the amine compound is a compound in which, in Formula 3, each of R16 and R17 is -L3-Si(R18)$_n$(OR19)$_{3-n}$, and L1 and L2 are each independently a single bond or an alkylene group having 1 to 12 carbon atoms, with the proviso that L3 is an alkylene group having 1 to 12 carbon atoms, and R18 and R19 are each independently an alkyl group having 1 to 12 carbon atoms and n is an integer ranging from 0 to 2, or the amine compound is a compound in which, in Formula 3, R16 is an alkyl group having 1 to 12 carbon atoms, each of L1 and L2 is a single bond, and R17 is -L3-Si(R18)$_n$(OR19)$_{3-n}$, wherein L3 is an alkylene group having 1 to 12 carbon atoms, and R18 and R19 are each independently an alkyl group having 1 to 12 carbon atoms and n is an integer ranging from 0 to 2, wherein an optical axis of the liquid crystal layer comprising the liquid crystal compound has an inclination angle of 0° to 25° with respect to a plane of the liquid crystal layer, wherein the liquid crystal film satisfies the requirements of General Formula 1:

X<8%   [General Formula 1]

wherein X represents a percentage (%) of the absolute value of a variation in phase difference value of the liquid crystal layer formed of the liquid crystal composition after the liquid crystal layer is kept at 80° C. for 100 hours, based on an initial phase difference value of the liquid crystal layer, and wherein X is calculated by the formula, 100×(|R$_o$−R$_1$|)/R$_o$, wherein R$_o$ is the initial phase difference value of the liquid crystal layer, and R$_1$ represents a phase difference value of the liquid crystal layer after the liquid crystal layer is kept at 80° C. for 100 hours.

2. The liquid crystal film of claim 1, wherein the horizontally alignable liquid crystal compound comprises a multifunctional polymerizable liquid crystal compound and a monofunctional polymerizable liquid crystal compound.

3. The liquid crystal film of claim 2, wherein the monofunctional polymerizable liquid crystal compound is comprised at a content of greater than 0 parts by weight and not more than 100 parts by weight, based on 100 parts by weight of the multifunctional polymerizable liquid crystal compound.

4. The liquid crystal film of claim 1, wherein the horizontally alignable liquid crystal compound is represented by Formula 1:

[Formula 1]

wherein A is a single bond, —COO— or —OCO—, and R$_1$ to R$_{10}$ are each independently hydrogen, a halogen, an alkyl group, an alkoxy group, an alkoxycarbonyl group, a cyano group, a nitro group, —O-Q-P or a substituent of Formula 2, or a pair of two adjacent substituents of R$_1$ to R$_5$ or a pair of two adjacent substituents of R$_6$ to R$_{10}$ are joined together to form a benzene ring substituted with —O-Q-P, with the proviso that at least one of the substituents R$_1$ to R$_{10}$ is —O-Q-P or the substituent of Formula 2, or at least one of the pair of two adjacent substituents of R$_1$ to R$_5$ and the pair of two adjacent substituents of R$_6$ to R$_{10}$ are joined together to form a benzene ring substituted with —O-Q-P, wherein Q is an alkylene group or an alkylidene group, and P is an alkenyl group, an epoxy group, a cyano group, a carboxyl group, an acryloyl group, a methacryloyl group, an acryloyloxy group or a methacryloyloxy group:

[Formula 2]

wherein B is a single bond, —COO— or —OCO—, and R$_{11}$ to R$_{15}$ are each independently hydrogen, a halogen, an alkyl group, an alkoxy group, an alkoxycarbonyl group, a cyano group, a nitro group or —O-Q-P, or a pair of two substituents of R$_{11}$ to R$_{15}$ are joined together to form a benzene ring substituted with —O-Q-P, with the proviso that at least one of the substituents R$_{11}$ to R$_{15}$ is —O-Q-P, or two adjacent substituents of R$_{11}$ to R$_{15}$ are joined together to form a benzene ring substituted with —O-Q-P, wherein Q is an alkylene group or an alkylidene group, and P is an alkenyl group, an epoxy group, a cyano group, a carboxyl group, an acryloyl group, a methacryloyl group, an acryloyloxy group or a methacryloyloxy group, and wherein the symbol

"  "

means that a portion of the symbol is connected to a mother compound.

5. The liquid crystal film of claim 1, wherein the liquid crystal composition further comprises a photopolymerization initiator.

6. The liquid crystal film of claim 1, which further comprises a substrate layer and wherein the liquid crystal layer is formed on one surface of the substrate layer.

7. The liquid crystal film of claim 6, wherein the substrate layer is an optically isotropic substrate layer, an optically anisotropic substrate layer or a polarizing element.

8. A display device comprising the liquid crystal film according to claim 1.

* * * * *